United States Patent
Cormie et al.

(10) Patent No.: US 11,418,826 B2
(45) Date of Patent: Aug. 16, 2022

(54) CONTENT-MODIFICATION SYSTEM WITH SUPPLEMENTAL CONTENT STITCHING FEATURE

(71) Applicant: Roku, Inc., San Jose, CA (US)

(72) Inventors: Steven Michael Cormie, Cambridge (GB); Matthew George Grover, Cardiff (GB); Stefanos Christakis Liassides, Cardiff (GB)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 16/866,005

(22) Filed: May 4, 2020

(65) Prior Publication Data

US 2020/0389689 A1    Dec. 10, 2020

Related U.S. Application Data

(60) Provisional application No. 62/858,870, filed on Jun. 7, 2019.

(51) Int. Cl.
*H04N 7/10* (2006.01)
*H04N 21/262* (2011.01)
(Continued)

(52) U.S. Cl.
CPC . *H04N 21/26258* (2013.01); *H04N 21/23424* (2013.01); *H04N 21/4316* (2013.01); *H04N 21/84* (2013.01)

(58) Field of Classification Search
CPC ....... H04N 21/26258; H04N 21/23424; H04N 21/4316; H04N 21/84; H04N 21/4622;
(Continued)

(56) References Cited

U.S. PATENT DOCUMENTS

| 9,146,990 B2 | 9/2015 | Scherf et al. |
| 9,495,451 B2 | 11/2016 | Harron |

(Continued)

FOREIGN PATENT DOCUMENTS

| JP | 2008005258 | 1/2008 |
| WO | WO 2016-207816 A1 | 12/2016 |
| WO | WO 2018-004958 A1 | 1/2018 |

OTHER PUBLICATIONS

International Searching Authority Written Opinion for PCT/US2020/036459 dated Sep. 17, 2020.
(Continued)

*Primary Examiner* — Annan Q Shang
(74) *Attorney, Agent, or Firm* — McDonnell Boehnen Hulbert & Berghoff LLP

(57) ABSTRACT

In one aspect, a method includes receiving from a content-presentation device a request for first supplemental content for presentation during first content-modification operation, and transmitting to the content-presentation device a link to a set of content items in a playlist including the first supplemental content. A request may be received from the content-presentation device for second supplemental content for presentation during a second content-modification operation. A determination may be made that the second content-modification operation is scheduled immediately after the first content-modification operation. Responsive to the determination, the playlist may be modified to include the second supplemental content positioned immediately after the first supplemental content. The link may be configured for retrieving the first and second supplemental content by the content-presentation device, and for performance of the first content-modification operation and the second content-modification operation immediately after performance of the first content-modification operation.

20 Claims, 13 Drawing Sheets

(51) Int. Cl.
  *H04N 21/234* (2011.01)
  *H04N 21/431* (2011.01)
  *H04N 21/84* (2011.01)

(58) Field of Classification Search
  CPC ........... H04N 21/812; H04N 21/44016; H04N 21/44008; H04N 21/858; H04N 21/2668; H04N 21/26241; H04N 21/25866
  See application file for complete search history.

(56) References Cited

U.S. PATENT DOCUMENTS

| | | | |
|---|---|---|---|
| 9,992,533 B2 | 6/2018 | Lee et al. | |
| 10,506,275 B1 | 12/2019 | Thielen et al. | |
| 10,523,977 B1* | 12/2019 | Neill | H04N 21/23424 |
| 2007/0136742 A1 | 7/2007 | Sparrell | |
| 2009/0022172 A1* | 1/2009 | Haberman | H04N 21/23424 370/429 |
| 2009/0187939 A1* | 7/2009 | Lajoie | H04N 7/17318 725/34 |
| 2009/0265737 A1* | 10/2009 | Issa | H04N 21/4788 725/38 |
| 2012/0144420 A1* | 6/2012 | Del Sordo | H04N 21/4383 725/35 |
| 2012/0159538 A1* | 6/2012 | Phillips | H04N 21/25891 725/34 |
| 2012/0167132 A1* | 6/2012 | Mathews | H04N 21/4532 725/32 |
| 2014/0150019 A1 | 5/2014 | Ma et al. | |
| 2014/0195345 A1* | 7/2014 | Lyren | G06Q 30/0271 705/14.53 |
| 2015/0020095 A1* | 1/2015 | Yoo | H04N 21/2668 725/34 |
| 2015/0095461 A1 | 4/2015 | McGowan et al. | |
| 2015/0195480 A1 | 7/2015 | Niemeijer | |
| 2015/0201227 A1* | 7/2015 | Krasko | H04N 21/8456 725/34 |
| 2015/0302487 A1* | 10/2015 | Reynolds | H04L 65/60 705/14.73 |
| 2015/0373385 A1* | 12/2015 | Straub | H04N 21/23424 725/34 |
| 2015/0382042 A1* | 12/2015 | Wagenaar | H04L 65/4084 725/34 |
| 2016/0073176 A1* | 3/2016 | Phillips | H04L 47/15 725/35 |
| 2016/0080237 A1 | 3/2016 | Halepovic et al. | |
| 2016/0182923 A1* | 6/2016 | Higgs | H04N 21/23424 725/34 |
| 2016/0316233 A1 | 10/2016 | Ghadi | |
| 2017/0280181 A1* | 9/2017 | Ramaley | H04L 65/601 |
| 2017/0289639 A1* | 10/2017 | Reisner | H04N 21/812 |
| 2017/0332113 A1 | 11/2017 | Haritaoglu et al. | |
| 2018/0241969 A1* | 8/2018 | Karlsson | H04N 21/64315 |
| 2018/0270526 A1* | 9/2018 | Nguyen | H04N 21/4331 |
| 2019/0230387 A1* | 7/2019 | Gersten | G06F 16/783 |
| 2019/0313135 A1* | 10/2019 | Pathak | H04N 21/8586 |
| 2020/0029108 A1 | 1/2020 | Dunker et al. | |
| 2020/0059693 A1* | 2/2020 | Neumeier | H04N 21/4383 |
| 2020/0204861 A1* | 6/2020 | Loheide | H04N 21/25883 |
| 2020/0316946 A1* | 10/2020 | Tanaka | B41J 2/16523 |
| 2020/0344307 A1* | 10/2020 | Livshits | H04L 67/02 |
| 2021/0021885 A1* | 1/2021 | Smith | H04N 21/251 |

OTHER PUBLICATIONS

International Search Report for PCT/US2020/036459 dated Sep. 17, 2020.
Taiwanese Search Report for Patent Application 109119087 completed on Dec. 30, 2020.
Taiwanese Office Action for Patent Application 109119087 dated Dec. 31, 2020.

* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | Compare first fingerprint data and second fingerprint data | | | | | |
| T10 | Detect a match between first fingerprint data and second fingerprint data | | | | | |
| T11 | Identify the channel on which the second content is being received | | | | | |
| T12 | Generate metadata associated with the identified channel | | | | | |
| T13 | Transmit an indication of the identified channel and the associated metadata | | | | | |
| T14 | | | | | Receive the indication of the identified channel and the associated metadata | |

Figure 4B

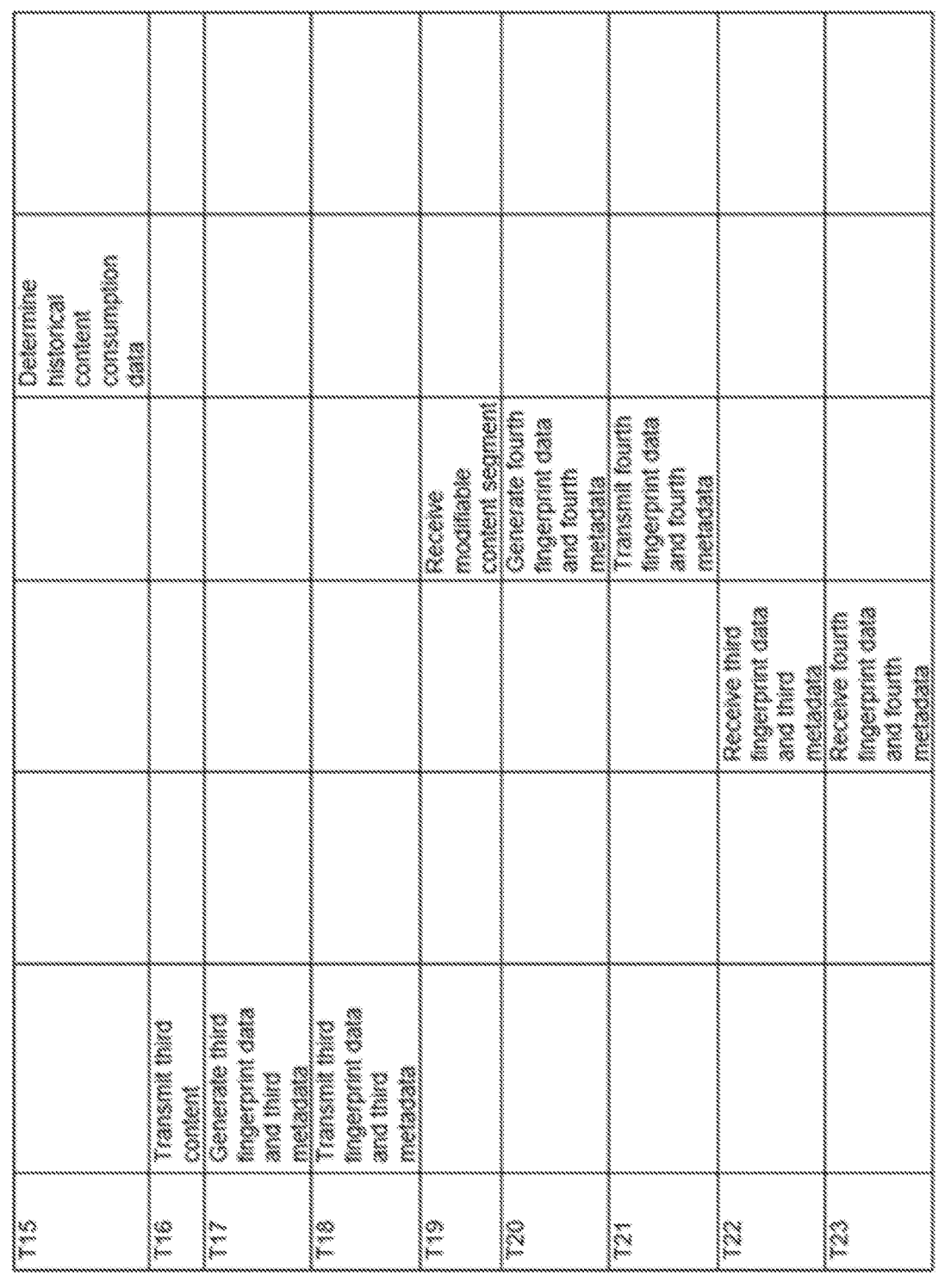

|   |   |   |   |   |   |   |   |   |
|---|---|---|---|---|---|---|---|---|
| T15 | T16 | T17 | T18 | T19 | T20 | T21 | T22 | T23 |
| Determine historical content consumption data | | | | | | | | |
| | | | | | Receive modifiable content segment Generate fourth fingerprint data and fourth metadata Transmit fourth fingerprint data and fourth metadata | | | |
| | | | | | | | Receive third fingerprint data and third metadata Receive fourth fingerprint data and fourth metadata | |
| | Transmit third content Generate third fingerprint data and third metadata | | Transmit third fingerprint data and third metadata | | | | | |

Figure 4C

| | | | | | |
|---|---|---|---|---|---|
| T24 | | Compare at least a portion of third fingerprint data and at least a portion of fourth fingerprint data | | | |
| T25 | | Detect a match between at least a portion of third fingerprint data and at least a portion of fourth fingerprint data | | | |
| T26 | | Identify an upcoming content modification opportunity on the identified channel | | | |
| T27 | | Transmit the third fingerprint data and the third metadata | | | |
| T28 | | | Receive third fingerprint data and third metadata | | |
| T29 | | | Receive fifth content | | |
| T30 | | | Output for presentation fifth content | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | Receive request and select supplemental content | | | |
| T37 | | | | Transmit request for link | | | |
| T38 | | | | | | | Transmit link |

Figure 4E

| T39 | T40 Receive link and retrieve supplemental content | T41 Perform content modification operation | | Transmit link | | | |
|---|---|---|---|---|---|---|---|

Figure 4F

CONTENT-MODIFICATION SYSTEM WITH SUPPLEMENTAL CONTENT STITCHING FEATURE

CROSS-REFERENCE TO RELATED APPLICATIONS

This application claims priority under 35 U.S.C. § 119(e) to U.S. Provisional Patent Application Ser. No. 62/858,870, filed on Jun. 7, 2019, which is incorporated herein in its entirety by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes receiving from a content-presentation device a request for first supplemental content for presentation by the content-presentation device as part of a first content-modification operation; transmitting to the content-presentation device a link that points to a set of content items arranged in a playlist, wherein the playlist includes the first supplemental content; receiving from the content-presentation device, a request for second supplemental content for presentation by the content-presentation device as part of a second content-modification operation; making a determination that the content-presentation device is scheduled to perform the second content-modification operation immediately after performing the first content-modification operation; and responsive to making the determination, modifying the playlist to further include the second supplemental content positioned immediately after the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

In another aspect, a computing system includes one or more processors; and a non-transitory computer-readable storage medium having stored thereon program instructions that, upon execution by the one or more processors, cause the computing system to carry out operations including: receiving from a content-presentation device a request for first supplemental content for presentation by the content-presentation device as part of a first content-modification operation; transmitting to the content-presentation device a link that points to a set of content items arranged in a playlist, wherein the playlist includes the first supplemental content; receiving from the content-presentation device, a request for second supplemental content for presentation by the content-presentation device as part of a second content-modification operation; making a determination that the content-presentation device is scheduled to perform the second content-modification operation immediately after performing the first content-modification operation; and responsive to making the determination, modifying the playlist to further include the second supplemental content positioned immediately after the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

In another aspect, a non-transitory computer-readable storage medium having stored thereon program instructions that, upon execution by one or more processors of a computing system, cause the computing system to carry out operations. The operations include: receiving from a content-presentation device a request for first supplemental content for presentation by the content-presentation device as part of a first content-modification operation; transmitting to the content-presentation device a link that points to a set of content items arranged in a playlist, wherein the playlist includes the first supplemental content; receiving from the content-presentation device, a request for second supplemental content for presentation by the content-presentation device as part of a second content-modification operation; making a determination that the content-presentation device is scheduled to perform the second content-modification operation immediately after performing the first content-modification operation; and responsive to making the determination, modifying the playlist to further include the second supplemental content positioned immediately after the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
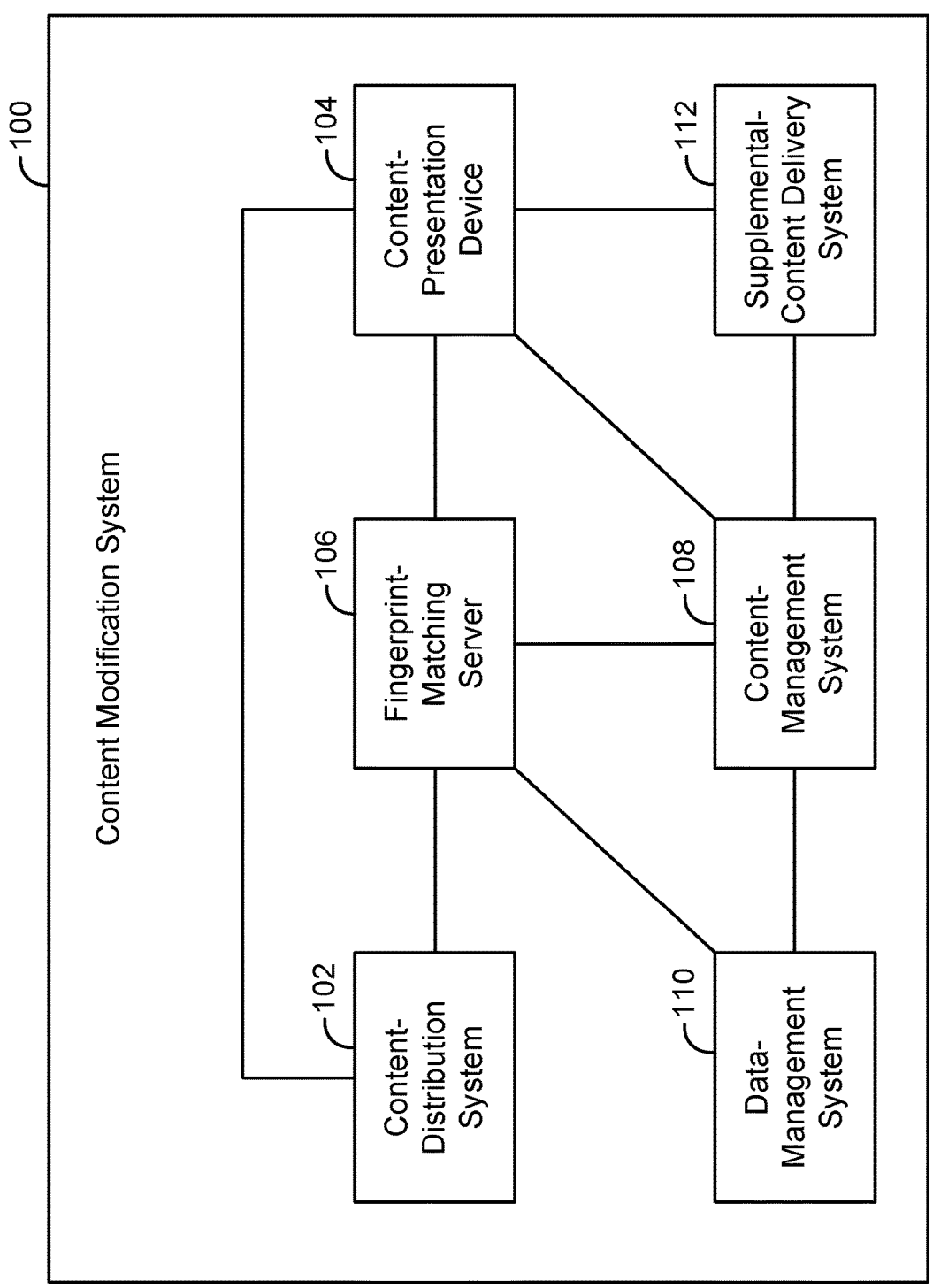
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

Content modification may involve identifying a segment of content as being modifiable, and modifying the identified content either by replacing with supplemental content, or by overlaying supplemental content on it. In either case, a modification operation may entail presenting the supplemental content during a time interval originally scheduled for presentation of the single segment of content by a content-presentation device. In practice, there can be circumstances in which two or more segments of supplemental content may be identified for consecutive, back-to-back content-modification operations by a given content-presentation device. Thus, instead of modification of a single segment of content, two or more consecutive segments of content may be subject to two or more consecutive content-modification operations by a content-presentation device. In order to accommodate such situations with efficiency and in a streamlined fashion, further operations may be used to "stitch" together, or concatenate, two or more segments of supplemental content so as to ensure contiguous download and delivery of multiple supplemental content segments to the content-presentation device, and to facilitate consecutive content-modification operations with the multiple supplemental content segments.

Content modification with content stitching may require timing circumstance in which the entirety of second supplemental content is received by the content-presentation device in sufficient time to be available for completion of a second presentation modification operation. However, this circumstance may not necessarily be guaranteed. For example, transmission and/or network delays could cause download to the content-presentation device of the second supplemental content to take too long to complete in time to be available for the complete second content-modification operation. In particular, if the second presentation-modification operation is a full segment replacement, and the entire second supplemental content is not received by end of the segment being replaced, there can be a gap during which no content at all is available for playout (presentation). To address this scenario, the content-presentation device may carry out additional and/or modified operations to unschedule a second content-modification operation if it determines that second supplemental content will not be fully received in time.

Accordingly, example embodiments described herein that both accommodate content stitching in content-modification operations, and unscheduling of content-modification operations to avoid potential deleterious effects of incomplete receipt of supplemental content prior to completion of content-modification operations.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
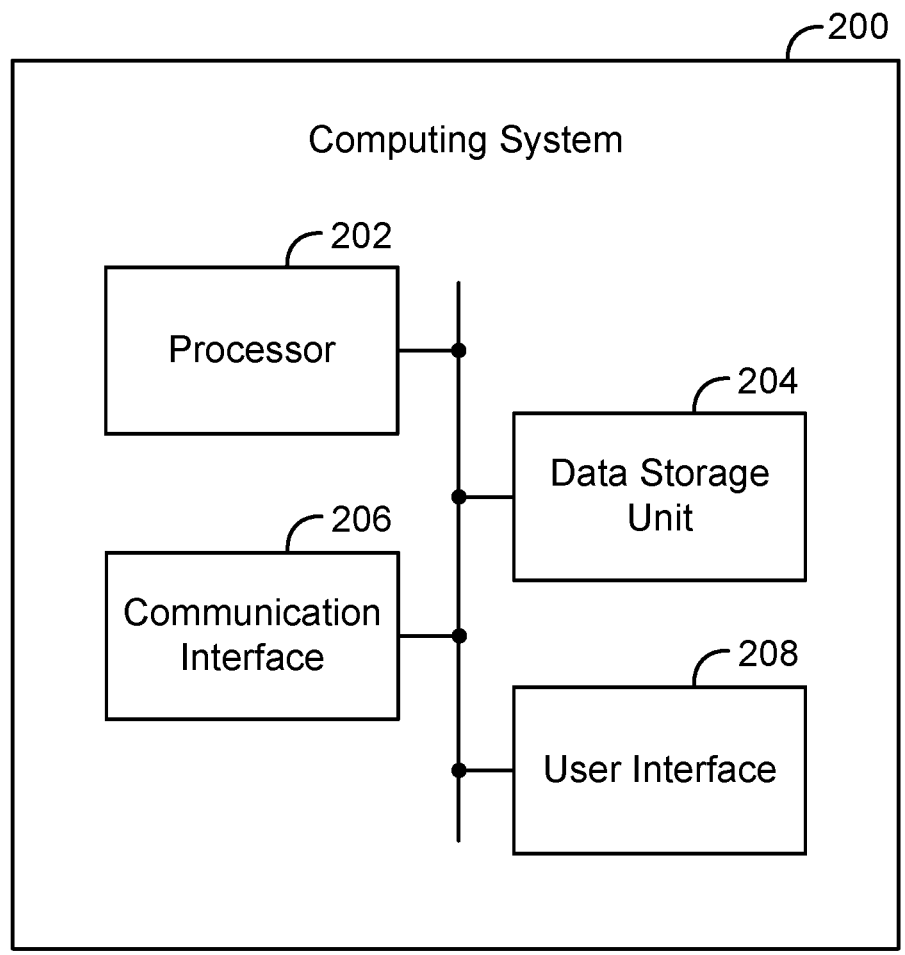
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
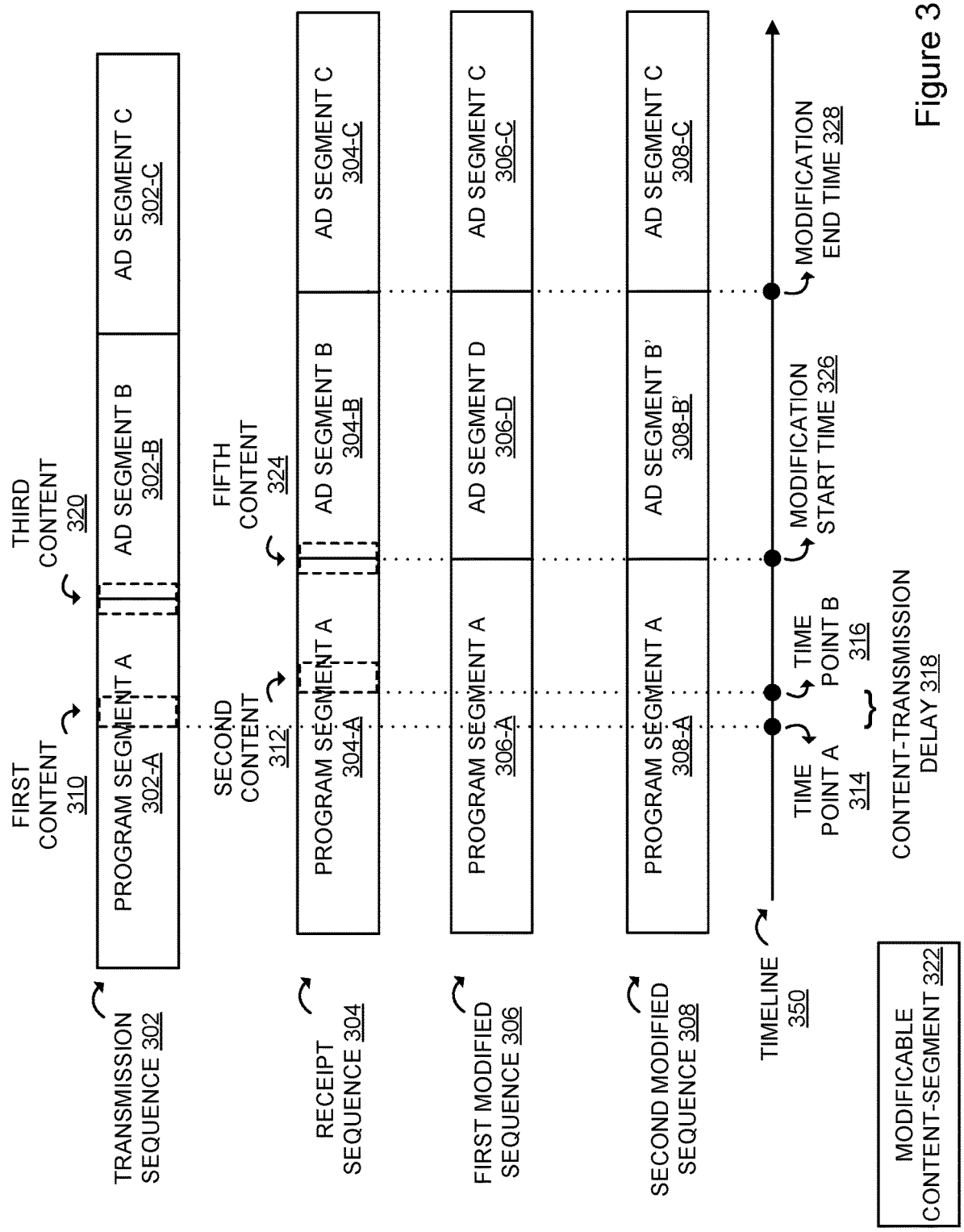
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A 302-A, followed by an AD SEGMENT B 302-B, followed by AD SEGMENT C 302-C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A 304-A, followed by the AD SEGMENT B 304-B, followed by the AD SEGMENT C 302-C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A 306-A, followed by the AD SEGMENT D 306-D (which replaced the AD SEGMENT B 304-B), followed by AD SEGMENT C 306-C.

As another example, it can be desirable for the content-presentation device 104 to overlay, on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A 308-A, followed by the AD SEGMENT B' 308-B' (which is the AD SEGMENT B 304-B modified with overlay content), followed by AD SEGMENT C 308-C.

Other portions of FIG. 3 will be described later in this disclosure as related concepts are introduced and described.

Moving on in view of the context provided above, FIGS. 4A, 4B, 4C, 4D, 4E and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT 322 shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content-Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT 322 is included within the THIRD CONTENT 320, as shown in FIG. 3, and therefore can identify an upcoming content-modification opportunity.

As noted above, the fingerprint-matching server 106 can generate third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame market, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content-Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A 304-A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B 304-B with at least a portion of a different advertisement segment that is perhaps more targeted to the end-user. As another example, it can be desirable for the content-presentation device 104 to overlay on at least a portion of the AD SEGMENT B 304-B, overlay content that enhances at least a portion of the AD SEGMENT B 304-B in a way that is again perhaps more targeted to the end-user.

During a time-period T31, the content-presentation device 104 can generate fingerprint data representing the fifth content. This fingerprint data is referred to herein as "fifth fingerprint data." The content-distribution system 102 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The fingerprint-matching server 106 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the third fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B 302-B with the AD SEGMENT B 304-B. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B 302-B, thereby modifying it to AD SEGMENT B 304-B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Concatenation of Multiple Supplemental Content Segments Content modification as described above by way of example illustrates various operations for modification of a single segment of content that has been identified as modifiable, either by replacing the single segment with supplemental content, or by overlaying supplemental content on the single segment. In either case, the modification operation entails presenting the supplemental content during a time interval originally scheduled for presentation of the single segment of content by the content-presentation device 104. In practice, there can be circumstances in which two or more segments of supplemental content may be identified for consecutive, back-to-back content-modification operations by a given content-presentation device. Thus, instead of modification of a single segment of content, two or more consecutive segments of content may be subject to two or more consecutive content-modification operations by a content-presentation device. In order to accommodate such situations with efficiency and in a streamlined fashion, further operations may be used to "stitch" together, or concatenate, two or more segments of supplemental content so as to ensure contiguous download and delivery of multiple supplemental content segments to the content-presentation device, and to facilitate consecutive content-modification operations with the multiple supplemental content segments.

Various operations relating to content "stitching" are now described. By way of example, stitching operations are illustrated for the case of two consecutive supplemental content segments. The two supplemental content segments are referred below as "first supplemental content" and "second supplemental content." Similarly, the content-modification operations corresponding to the first and second supplemental content are referred to as a "first content-modification operation" and "second content-modification operation." It should be understood that the example operations could be extended for more than two supplemental content segments, and that the illustration of two supplemental content segments is not limiting with respect to example embodiments described herein.

Accordingly, in another aspect of the disclosure, the content-management system 108 and the content-presentation device 104 can perform acts to facilitate the content-presentation device 104 using a link to retrieve first and second supplemental content, which the content-presentation device 104 can use in connection with performing first and second content-modification operations, where the second content-modification operation is performed immediately after the first content-modification operation is performed. Examples of content stitching will first be described in general terms, after which a more detailed description is presented, also by way of example.

In one example configuration, the content management-system 108 can receive from the content-presentation device 104, a request for first supplemental content for use by the content-presentation device 104 in connection with performing a first content-modification operation.

The content-management system 108 can transmit to the content-presentation device 104, a link that points to a set of content items defined by a playlist, where the playlist includes first supplemental content. In one example, the transmitted link is associated with the content-presentation device 104 and is transmitted to only one content-presentation device, which is the content-presentation device 104. In this way, the transmitted link can be a device-specific link.

The content-management system 108 can receive from the content-presentation device 104, a request for second supplemental content for use by the content-presentation device 104 in connection with performing a second content-modification operation.

The content-management system 108 can determine that the content-presentation device 104 is scheduled to perform the second content-modification operation immediately after performing the first content-modification operation. In one example, the content-management system 108 can receive first metadata that specifies scheduling data related to the first content-modification operation and can receive second metadata that specifies scheduling data related to the second content-modification operation. In this case, the content-management system 108 determining that the content-presentation device 104 is scheduled to perform the second content-modification operation immediately after performing the first content-modification operation can involve the content-management system 108 using at least the received first metadata and the received second metadata to determine that the content-presentation device 104 is scheduled to perform the second content-modification operation immediately after performing the first content-modification operation.

Responsive to determining that the content-presentation device 104 is scheduled to perform the second content-modification operation immediately after performing the first content-modification operation, the content-management system 108 can cause the playlist to be modified such that that modified playlist further includes the second supplemental content positioned immediately after the first supplemental content. In one example, this can involve the content-management system 108 appending or concatenating, within a memory buffer, the second supplemental content to the first supplemental content, thereby stitching together the first supplemental content and the second supplement content together, in that order, within the memory buffer.

The content-management system 108 can cause the playlist to be modified as described above, to facilitate the content-presentation device 104 (i) using the link to retrieve the first supplemental content and the second supplemental content, (ii) performing the first content-modification operation, and (iii) performing the second content-modification operation immediately after performing the first content-modification operation. In some instances, the content-management system 108 can also transmit to the content-presentation device, a message indicating that the link points to the first supplemental content and the second supplemental content, to facilitate the content-presentation device 104 performing one or more of the acts described above.

From the content-presentation device 104 perspective, the content-presentation device 104 can transmit a request for first supplemental content and can transmit a request for second supplemental content. The content-presentation device 104 can also receive a link that points to a set of content items defined by a playlist, wherein the playlist includes the requested first supplemental content and the requested second supplemental content positioned immediately after the first supplemental content. The content-presentation device 104 can (i) use the received link to retrieve the first supplemental content and the second supplemental content, (ii) use the retrieved first supplemental content in connection with performing a first content-modification operation; and (iii) use the retrieved second supplemental content in connection with performing a second content-modification operation immediately after the first content-modification operation is performed.

In one example, the content-presentation device 104 can receive a message indicating that the received link points to the first supplemental content and the second supplemental content. In this case, the content-presentation device 104 can perform one or more of the acts described above, in response to receiving the message.

Figure 5A:
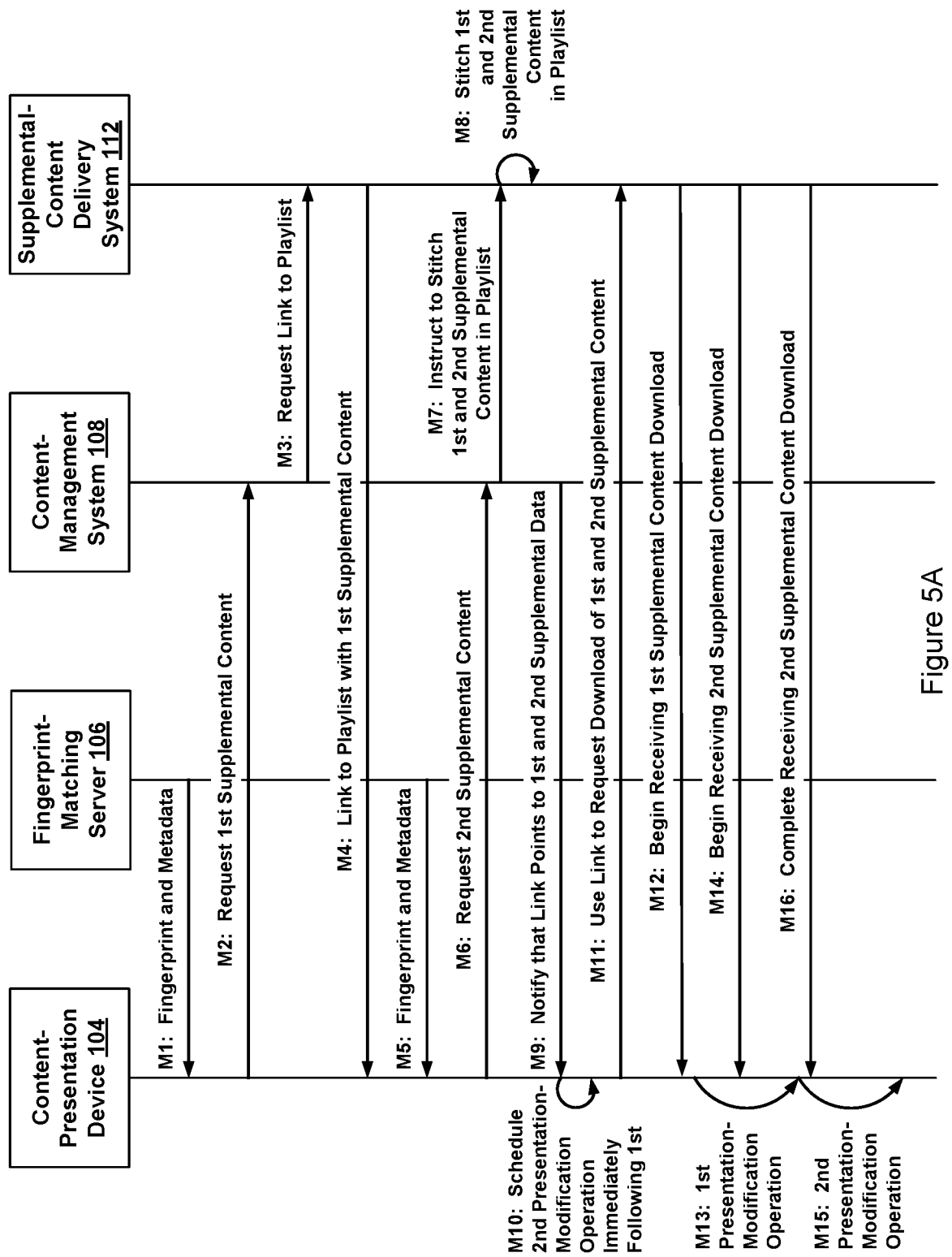
FIG. 5A is an illustration of operations relating to stitching of content, in accordance with example embodiments.

A more detail example of content stitching is illustrated in FIG. 5A, which shows certain example operations that may be carried out by the content-presentation device 104, the fingerprint-matching server 106, the content-management system 108, and the supplemental-content delivery system 112, for example. The example operations are represented in terms of a message flow or communication flow between the example system elements. In FIG. 5A, time increases downward, thus setting a temporal order of messages or communication between the example elements. It should be appreciated that the temporal spacing between messages is not necessarily intended to indicate an actual amount of time, nor are the relative sizes of the spacings as illustrated in the figure intended to indicate actual relative sizes. Further, it should be noted that the specific relative orderings of at least some of the messages are illustrative, and other orderings are possible.

For context, the messages and steps, labeled M1, . . . , M16, correspond approximately to operations in T27-T41 of FIGS. 4D-4F described above, but with modifications or additions for implementation of content stitching.

In accordance with example embodiments, the fingerprint-matching server 106 may send message M1 to the content-presentation device 104 including fingerprint and metadata of first supplemental content that has been identified as replacement content for broadcast content during a first upcoming temporal interval. Message M1 may correspond to operations in time T27. In an example, the first supplemental content may also be identified as specific to the content-presentation device 104.

In response to message M1, the content-presentation device 104 may send a message M2 to the content-management system 108 requesting the first supplemental content. The message may include metadata associated with the first supplemental content, such that the content-management system 108 may determine when the first supplemental content is scheduled to be presented by the content-presentation device 104 as replacement content. Message M2 may correspond to operations in time T35.

In response to message M2, the content-management system 108 may send a message M3 to the supplemental-content delivery system 112 requesting a link to a playlist that includes the first supplemental content. Message M3 may correspond to operations in time T37.

Note that the term "playlist" as used in the present illustration may be taken to a computer-readable storage location containing actual content, possibly as well as associated metadata. This arrangement may differ from some customary ones in which a playlist may contain only metadata and/or logical pointers to locations from which associated content may be accessed or retrieved. It should be understood, however, that the example operation described herein could be modified and/or extended to work with such customary playlist arrangements. For example, the supplemental-content delivery system could be or include a content-delivery network (CDN) in which actual content may be stored in multiple, possibly distributed, locations. In this arrangement, a playlist could be a list of pointers to addressable locations containing actual content associated with the pointers. However, the link to the playlist may make details of the actual content storage transparent to an entity or device that may use the link to access and/or retrieve the content. In this sense, the link to the playlist may be considered effectively a link to the content represented in the playlist, whether directly contained or indirectly pointed to.

In response to message M3, the supplemental-content delivery system 112 may send a message M4 to the content-presentation device 104 including a link to the playlist, and thus to the first supplemental content. Although not necessarily shown, the content-presentation device 104 may also schedule a first content-modification operation for presentation of the first supplemental content. Message M3 may correspond approximately to operations in time T38. More particularly, in the operations illustrated in FIGS. 4E and 4F, the link sent from the supplemental-content delivery system 112 is received by the content-management system 108, which then sends the link to the content-presentation device. In the present illustration, the supplemental-content delivery system 112 sends the link directly to the content-presentation device 104. This is an example of a possible variation of operations that may achieve the same ends.

Next, the fingerprint-matching server 106 may send message M5 to the content-presentation device 104 including fingerprint and metadata of second supplemental content that has been identified as replacement content for broadcast content during a second upcoming temporal interval that immediately follows the first temporal interval. Message M5 may correspond to a second set of operations in time T27, this time relating to the second supplemental content. In an example, the second supplemental content may also be identified as specific to the content-presentation device 104.

In response to message M5, the content-presentation device 104 may send a message M6 to the content-management system 108 requesting the second supplemental content. The message may include metadata associated with the second supplemental content, such that the content-management system 108 may determine when the second supplemental content is scheduled to be presented by the content-presentation device 104 as replacement content. In particular, the content-management system 108 may determine that the second supplemental content is scheduled to be presented by the content-presentation device 104 immediately following presentation of the first supplemental content. Message M6 may correspond to a second set of operations in time T35, this time relating to the second supplemental content.

In response to receiving message M6, and determining that the second supplemental content is scheduled to be presented by the content-presentation device 104 immediately following presentation of the first supplemental content the content-management system 108, the content-management system 108 may send a message M7 to the supplemental-content delivery system 122 instructing the supplemental-content delivery system to stitch the second supplemental content to the end of the first supplemental content. In this way, the supplemental-content delivery system 112 may cause the second supplemental content to be positioned immediately following the first supplemental content in the playlist. Since the link sent in message M4 to the content-presentation device points to the playlist, the same link may now be used to retrieve both the first and second supplemental content from the supplemental-content delivery system.

In response to receiving message M7, the supplemental-content delivery system 112, may carry out operation M8, which entails concatenating, or stitching, the second supplemental content to the first supplemental content. The operation may be done in an internal buffer or other memory storage of the supplemental-content delivery system used, for example, for staging download of the first and second supplemental content from the supplemental-content delivery system 112 to the content-presentation device 104. As such, the second supplemental content may be positioned immediately following the first supplemental content in the internal buffer. Further, the link pointing to the playlist may ultimately be pointing, directly or indirectly to the internal buffer.

Considering again various implementations of playlists, the operation of stitching or concatenating the second supplemental content to the end of the first supplemental content could involve either relative positioning of actual content in memory or relative positioning of pointers in playlist memory to actual content locations in content memory. In an example implementation in which the playlist contains actual content, positioning the second supplemental content immediately after the first supplemental content in a buffer or other form of memory may entail positioning the actual data making up the second supplemental content immediately after the actual data making up the first supplemental content. In an example implementation in which the playlist contains pointers to the content locations containing the actual data of the first and second supplemental content, positioning the second supplemental content immediately after the first supplemental content in a buffer or other form of memory may entail positioning in the playlist a pointer to the actual second supplemental content immediately following a pointer to the actual first supplemental content. In the pointer implementation of the playlist, the actual locations of the first and second supplemental content could contiguous in memory, or separate.

Having sent message M7 to the supplemental-content delivery system 112, the content-management system 108 may then send a message M9 to the content-presentation device 104 indicating or notifying that the link points to both the first and second supplemental content. In the present illustration, the content-presentation device 104 already obtained the link in message M4.

In operation M10, the content-presentation device 104 schedules a second presentation-modification operation for presentation of the second supplemental content immediately following the first content-modification operation. That is, the first and second content-modification operation are scheduled back-to-back.

The content-presentation device 104 may then send a message M11 including the link to the supplemental-content delivery system 112 in a request to download the first supplemental content and the second supplemental content. In the present illustration, message M11 contains a single request for downloading both the first and second supplemental content. In an alternative operation described below in connection with FIG. 5B, a separate request may be sent for downloading the first and second supplemental content.

In response to message M11, the supplemental-content delivery system 112 may start downloading, and the content-presentation device 104 may start receiving, the first supplemental content in operation M12.

At some time after the download of the first supplemental content begins, the content-presentation device 104 may start the first presentation modification operation in operation M13. In the present illustration, the first content-modification operation may be a replacement operation in which the first supplemental content is the replacement content. In practice, the content-presentation device 104 may receive a sufficient amount of the first supplemental content prior to the scheduled start time of the replacement operation, such that the first supplemental content is available for the complete content replacement of the first content-modification operation.

The supplemental-content delivery system 112 may start downloading, and the content-presentation device 104 may start receiving, the second supplemental content in operation M14. Since the second supplemental content is concatenated to the end of the first supplemental content in the playlist, the start of the download of the second supplemental content may be continuous with the completion of the download of the first supplemental content. Since M14 occurs prior to completion of the first content-modification operation, it may be seen that the first supplemental content is completely received in time to be fully available for the replacement operation of the first content-modification operation.

At some time after the download of the second supplemental content begins, the content-presentation device 104 may start the second presentation-modification operation in operation M15. In the present illustration, the second content-modification operation may be a replacement operation in which the second supplemental content is the replacement content. In the present illustration, the content-presentation device 104 may be assumed to receive a sufficient amount of the second supplemental content prior to the scheduled start time of the replacement operation, such that the second supplemental content is available for the complete content replacement of the second content-modification operation.

The download of the second supplemental content may complete at operation M16. Thus, in the present illustration, the second supplemental content is completely received in time to be fully available for the replacement operation of the second content-modification operation. This timing circumstance may not always be guaranteed. Example operation discussed below in connection with FIG. 5B address timing circumstance where this is not the case.

N. Operations Related to Unscheduling Content-Modification Operations of Concatenated Supplemental Content Segments The example content stitching operations described above apply, at least implicitly, to a timing circumstance in which the entirety of the second supplemental content is received by the content-presentation device 104 in sufficient time to be available for completion of the second presentation modification operation. This is illustrated by message M15, which marks completion of the second supplemental content download prior to completion of the second presentation-modification operation, M16. That is, although the second presentation-modification operation begins before the download of the second supplemental content is complete, the download evidently, and by way of example, completes in time for successful performance of the second presentation-modification operation. However, this circumstance may not necessarily be guaranteed. For example, for a supplemental-content delivery system 112 implemented as a CDN or the like, transmission and/or network delays could cause download to the content-presentation device of the second supplemental content to take too long to complete in time to be available for the complete second content-modification operation. The content-stitching operations as described in FIG. 5A alone may not necessarily account such situations of excessive download delays.

In particular, if the second presentation-modification operation is a full segment replacement, and the entire second supplemental content is not received by end of the segment being replaced, there can be a gap during which no content at all is available for playout (presentation). To address this scenario, the content-presentation device 104 may carry out additional and/or modified operations that, prior to the completion of the first presentation-modification operation, compare the progress of the download of the second supplemental content with the scheduled start time of the second content-modification start time. If less than a threshold portion of the first content-modification operation remains to be completed while, at the same time, the download of the second supplemental content has not yet completed, then the content-presentation device 104 may unscheduled—or effectively cancel—the second content-modification operation. In this instance, the content-presentation device 104 can revert to presenting the originally scheduled content during the time slot that the second content-modification operation had been scheduled in. Further, the content-presentation device 104 may modify playout (presentation) of the originally scheduled content with overlay content, if such overlay content is available and the timing requirements of the overlay content can be accommodated within the time slot.

Accordingly, in another aspect of the disclosure, the content-presentation device 104 can perform acts to facilitate unscheduling a content-modification operation. Examples of unscheduling a content-modification operation will first be described in general terms, after which a more detailed description is presented, also by way of example. A number of the operations involved may be the same or similar to operations of content stitching, particular those relating to receiving first and second supplemental content, and scheduling first and second content-modification operations. However, by way of example, some of the operations of unscheduling are described with a different ordering than similar operations of content stitching. These differences at least illustrate variations that may be accommodated by and/or that may characterize different embodiments.

In one example configuration, the content-presentation device 104 can receive a link that points to a set of content items defined by a playlist, wherein when the link is received, the playlist includes first supplemental content, and wherein after the playlist is received, the playlist is modified to include second supplemental content positioned immediately after the first supplemental content. The content-presentation device 104 can use the received link to retrieve the first supplemental content and can perform a first content-modification operation that involves outputting for presentation the retrieved first supplemental content.

Before completing performing the first content-modification operation, the content-presentation device 104 can (i) use the received link to start retrieving the second supplemental content for use in connection with a second content-modification operation that the content-presentation device 104 is scheduled to perform immediately after performing the first content-modification operation, and (ii) determine that while a less than a threshold portion of the first content-modification operation remains to be performed, the content-presentation device 104 has not completed retrieving the second supplemental content. Responsive to determining this, the content-presentation device can unschedule the second content-modification operation.

In one example, the second content-modification operation can be a content replacement operation. In this example, the content-presentation device 104 unscheduling the second content-modification operation can involve the content-presentation device 104 replacing the scheduled second content-modification operation with a third content-modification operation that is a content overlay operation.

In some cases, the content-presentation device 104 can receive a message indicating that the link points to the second supplemental content. In such cases, the content-presentation device 104 can determine that while less than the threshold portion of the first content-modification operation remains to be performed, the content-presentation device 104 has not completed retrieving the second supplemental content is performed, responsive to receiving the message.

Figure 5B:
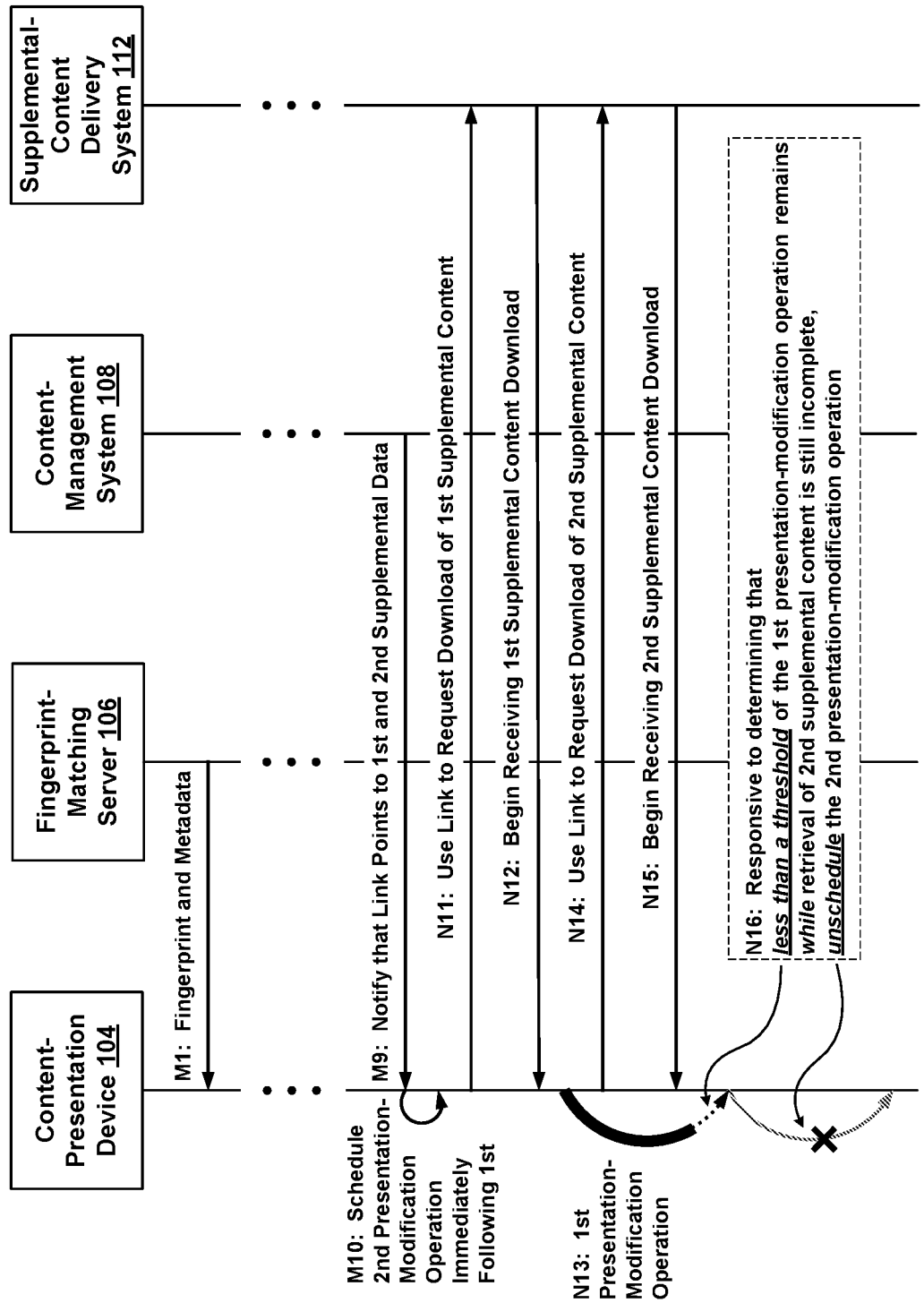
FIG. 5B in an illustration of operations relating to unscheduling of a content-modification operation, in accordance with example embodiments.

A more detail example of unscheduling a content-modification operation is illustrated in FIG. 5B, which shows certain example operations that may be carried out by the content-presentation device 104, for example. The format of FIG. 5B is the same as that of FIG. 5A. In particular, operations M1-M10 of content stitching shown if FIG. 5A are taken to the same as in the unscheduling shown in FIG. 5B. For the sake of brevity in FIG. 5B, operations M2-M8 are omitted, represented instead by vertical ellipses. The operations specific to unscheduling are then shown in operations N11-N16, although some may be the same or similar to the stitching operations described above.

After scheduling in M10 the second content-modification operation in operation for presentation of the second supplemental content immediately following the first content-modification operation, the content-presentation device 104 may then send a message N11 including the link to the supplemental-content delivery system 112 in a request to download the first supplemental content. In the present illustration, message N11 contains a single request for downloading just the first supplemental content.

In response to message N11, the supplemental-content delivery system 112 may start downloading, and the content-presentation device 104 may start receiving, the first supplemental content in operation N12.

At some time after the download of the first supplemental content begins, the content-presentation device 104 may start the first presentation-modification operation in operation M13. In the present illustration, the first content-modification operation may be a replacement operation in which the first supplemental content is the replacement content. In practice, the content-presentation device 104 may receive a sufficient amount of the first supplemental content prior to the scheduled start time of the replacement operation, such that the first supplemental content is available for the complete content replacement of the first content-modification operation.

Prior to completion of the first presentation-modification operation, the content-presentation device 104 may then send a message N14 including the link to the supplemental-content delivery system 112 in a request to download the second supplemental content. In the present illustration, message N14 contains a single request for downloading just the second supplemental content.

The supplemental-content delivery system 112 may start downloading, and the content-presentation device 104 may start receiving, the second supplemental content in operation M15. Since the second supplemental content is concatenated to the end of the first supplemental content in the playlist, the start of the download of the second supplemental content may be continuous with the completion of the download of the first supplemental content. Since M15 occurs prior to completion of the first content-modification operation, it may be seen that the first supplemental content is completely received in time to be fully available for the replacement operation of the first content-modification operation.

Prior to completion of the first presentation-modification operation, the content-presentation device 104 may perform operation N16 in which it determines that less than a threshold portion of the first presentation-modification remains to be completed, while the download of the second supplemental content has not yet completed. This may indicate that, although a portion of the second supplemental content has been received, the entirety of the second supplemental content may not be received in time to be available for the complete second content-modification operation. In response to this determination, the content-presentation device may unscheduled the second content-modification operation. This action may effectively cancel the second content-modification operation in order to avoid or avert a situation in which the second supplemental content "runs out" before the second content-modification operation is complete.

Since completion of the first content-modification operation coincides with the end of the temporal interval of the replacement operation of the first content-modification operation, the threshold portion used in the determination could be a fraction of that temporal interval or a specific amount of time. For example, the threshold could be 0.1 (or 10%) of the temporal interval, or a value such a 5 or 10 seconds. Other fractions and/or values could be used as well. The threshold test may be viewed as a check of how soon the first content-modification operation will complete and the second content-modification operation, scheduled immediately thereafter, will begin. If the download of the second supplemental content has not yet completed by the time there is less than the threshold portion remaining, it may be deemed that the download will not complete prior to the end of the second temporal interval in which the second supplemental content is scheduled to be used as replacement content. Thus, unscheduling the second content-modification operation can avoid a gap in available content for presentation that would otherwise occur during the second temporal interval.

Although not explicitly shown in FIG. 5B, the content-presentation device 104 may still modify content during the second temporal interval using an overlay operation. The may be possible, for example, if the content-presentation device has previously received and stored third supplemental content that may be suitable for overlaying on original content. Such an overlay operation may not be subject to the more strict timing considerations of a replacement operation.

As illustrated by way of example, some of the operations of FIGS. 5A and 5B that achieve roughly the same ends may differ. For example, in FIG. 5A, message M11 includes a single request for download of both the first and second supplemental content, while in FIG. 5B, separate requests, messages N11 and N14, are used for the two downloads. These differences should not viewed or taken as the cause or reason the different timing circumstances of the download of the second supplemental content in FIGS. 5A and 5B. Rather, they are illustrative of variations of message construction and order that could be used in either scenario.

IV. Example Methods

Figure 6:
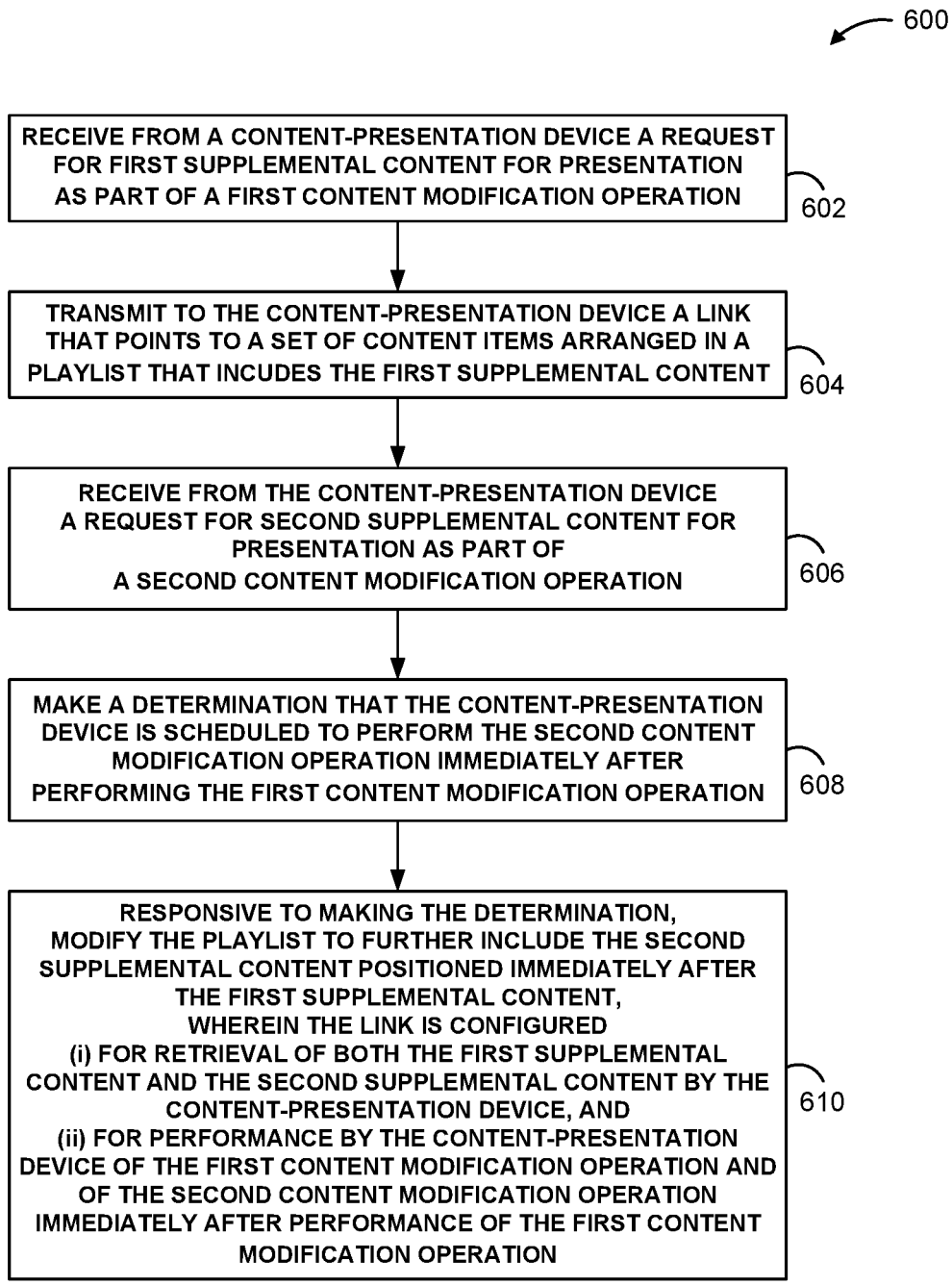
FIG. 6 is a flow chart of an example method.
Figure 7:
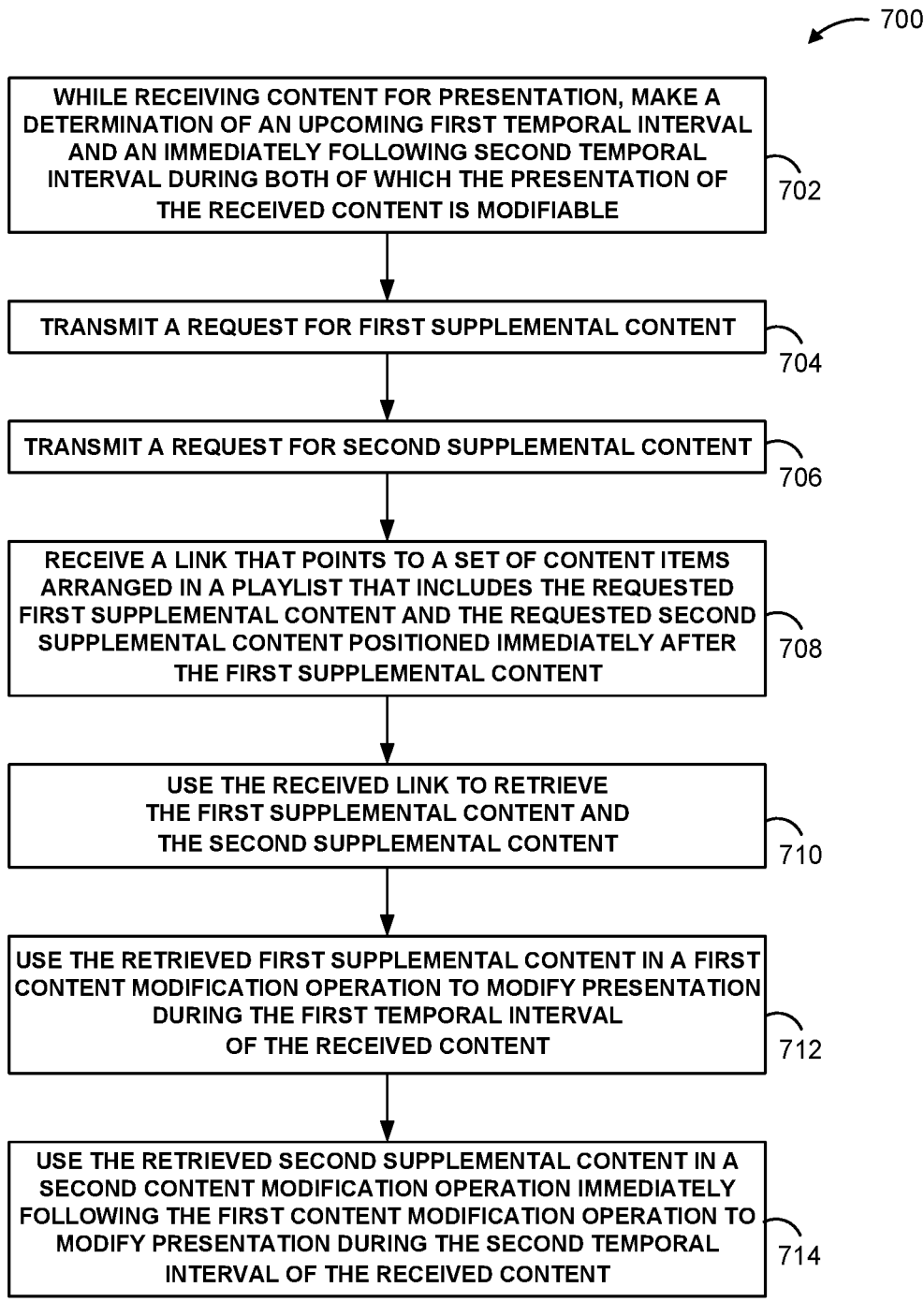
FIG. 7 is a flow chart of another example method.

FIGS. 6 and 7 are flow charts of example methods 600 and 700 of content modification with stitching of supplemental content, such as that described above. The example method 600 illustrates operations carried out on a network side by the content-management system 108 and/or the supplemental-content delivery system 112, for example. The example method 700 illustrates operations carried out on a client side by the content-presentation device 104, for example. Both of example methods 600 and 700 are now described, beginning first with example method 600, followed by example method 700.

Example method 600 could be implemented on and/or carried out by a computing system, such as computing system 200 described above. Non-limiting examples of such computing system include the content-management system 108 and/or the supplemental-content delivery system 112, for example. In particular, the example method 600 could be implemented on and/or carried out by the content-management system 108 and/or the supplemental-content delivery system 112 that may include one or more processors, and a non-transitory computer-readable storage medium having stored thereon program instructions that, upon execution by the one or more processors, cause the content-management system 108 and/or the supplemental-content delivery system 112 to carry out operations including operations of example method 600.

At block 602, the method 600 includes receiving from a content-presentation device a request for first supplemental content for presentation by the content-presentation device as part of a first content-modification operation. This could correspond to message M2 in FIG. 5A, for example.

At block 604, the method 600 includes transmitting to the content-presentation device a link that points to a set of content items arranged in a playlist, where the playlist includes the first supplemental content. This could correspond to message M4 in FIG. 5A, for example.

At block 606, the method 600 includes receiving from the content-presentation device, a request for second supplemental content for presentation by the content-presentation device as part of a second content-modification operation. This could correspond to message M6 in FIG. 5A, for example.

At block 608, the method 600 includes making a determination that the content-presentation device is scheduled to perform the second content-modification operation immediately after performing the first content-modification operation.

Finally, at block 610, the method 600 includes responsive to making the determination, modifying the playlist to further include the second supplemental content positioned immediately after the first supplemental content. In accordance with example embodiments, the link may be configured (i) for retrieval of both the first supplemental content and the second supplemental content by the content-presentation device, and (ii) for performance by the content-presentation device of the first content-modification operation and of the second content-modification operation immediately after performance of the first content-modification operation.

In accordance with example embodiments, the transmitted link may be associated exclusively with the content presentation-device, and transmitted only to the content-presentation device.

In accordance with example embodiments, the example method 600 may further involve receiving first metadata that specifies scheduling data related to the first content-modification operation, and receiving second metadata that specifies scheduling data related to the second content-modification operation. This could correspond to the content-management system 108 receiving the metadata in the requests of M2 and M6, for example. Making the determination that the content-presentation device is scheduled to perform the second content-modification operation immediately after performing the first content-modification operation may then involve using at least the received first metadata and the received second metadata to determine that the content-presentation device is scheduled to perform the second content-modification operation immediately after performing the first content-modification operation.

In accordance with example embodiments, modifying the playlist to further include the second supplemental content positioned immediately after the first supplemental content may involve appending the second supplemental content to the first supplemental content within a memory buffer. This action may entail concatenating the second supplemental content to the end of the first supplement content together within the memory buffer.

In accordance with example embodiments, the example method 600 may further involve transmitting to the content-presentation device a message indicating that the link points to both the first supplemental content and the second supplemental content. This could correspond to message M9 in FIG. 5A, for example. This message, or the information it conveys, may thus facilitate retrieval of both the first supplemental content and the second supplemental content by the content-presentation device. Retrieval of the first and second supplemental content may thus be used for performance by the content-presentation device of the first content-modification operation, and of the second content-modification operation immediately after performance of the first content-modification operation.

In accordance with example embodiments, the example method 600 may further involve receiving from the content-presentation device a content request for the first supplement content, where the content request for the first supplement content includes the link. In response to receiving the content request for the first supplemental content, the link may be used to retrieve the first supplemental content from the modified playlist and to transmit the first supplemental content to the content-presentation device. This could correspond to message M12 in FIG. 5A, for example. The example method 600 could also further involve receiving from the content-presentation device a content request for the second supplement content, where the content request for the second supplement content includes the link. In response to receiving the content request for the second supplemental content, the link may be used to retrieve the second supplemental content from the modified playlist, and to transmit the second supplemental content to the content-presentation device. This could correspond to message M14 in FIG. 5A, for example.

In accordance with example embodiments, the content request for the first supplemental content and the content request for the second supplemental content may be received in a single request message, as in message M11 in FIG. 5A for example. In another example, the requests could be received in separate messages, and in messages N11 and N14 in FIG. 5B, for example.

In accordance with example embodiments, using the link to retrieve the second supplemental content from the modified playlist may involve determining that the second supplemental content is also in the playlist and positioned immediately after the first supplemental content, based at least on a determination that the link was also received in the content request for the first supplemental content.

In accordance with example embodiments, transmitting the second supplemental content to the content-presentation device may involve transmitting the second supplemental content to the content-presentation device in one of (i) a single transmission including the second supplemental content concatenated to the end of the first supplemental content, or (ii) a separate transmission immediately following a transmission of the first supplemental content to the content-presentation device.

The example method 700 is described next.

Example method 700 could be implemented on and/or carried out by a computing system, such as computing system 200 described above, which may be configured to carry out content-presentation operations also described above. A non-limiting example of such computing system include the content-presentation device 104, for example. In particular, the example method 700 could be implemented on and/or carried out by an example content-presentation device 104 that may include one or more processors, and a non-transitory computer-readable storage medium having stored thereon program instructions that, upon execution by the one or more processors, cause the content-presentation device 104 to carry out operations including operations of example method 700.

At block 702, the method 700 includes the content-presentation device making a determination of an upcoming first temporal interval and an immediately following second temporal interval during both of which the presentation of the received content is modifiable. This determination may be made while the content-presentation device is receiving content for presentation, and could correspond to the content-presentation device evaluating fingerprint and metadata received in messages M1 and M5 in FIG. 5A, for example.

At block 704, the method 700 includes the content-presentation device transmitting a request for first supplemental content. This could correspond to message M2 in FIG. 5A, for example.

At block 706, the method 700 includes the content-presentation device transmitting a request for second supplemental content. This could correspond to message M6 in FIG. 5A, for example.

At block 708, the method 700 includes the content-presentation device receiving a link that points to a set of content items arranged in a playlist, where the playlist includes the requested first supplemental content and the requested second supplemental content positioned immediately after the first supplemental content. This could correspond to message M4 in FIG. 5A, for example.

At block 710, the method 700 includes the content-presentation device using the received link to retrieve the first supplemental content and the second supplemental content. This could correspond to a single message, as in message M11 in FIG. 5A, for example. Alternatively, it could correspond to separate messages N11 and N14 in FIG. 5B, for example.

At block 712, the method 700 includes the content-presentation device using the retrieved first supplemental content in a first content-modification operation to modify presentation during the first temporal interval of the received content. This could correspond to operation M13 in FIG. 5A, for example.

Finally, at block 714, the method 700 includes the content-presentation device using the retrieved second supplemental content in a second content-modification operation immediately following the first content-modification operation to modify presentation during the second temporal interval of the received content. This could correspond to operation M15 in FIG. 5A, for example.

In accordance with example embodiments, the example method 700 could further involve the content-presentation device receiving a message indicating that the received link points to the first supplemental content and the second supplemental content. This could correspond to message M9 in FIG. 5A, for example. Further, using the received link to retrieve the first supplemental content and the second supplemental content, using the retrieved first supplemental content in the first content-modification operation, and using the retrieved second supplemental content in the second content-modification operation immediately following the first content-modification operation, may all be performed responsive to receiving the message.

In accordance with example embodiments, using the retrieved first supplemental content in the first content-modification operation to modify presentation during the first temporal interval of the received content may involve presenting the retrieved first supplemental content during the first temporal interval as a replacement content of the received content, or as overlaid content on the received content. Similarly, and using the retrieved second supplemental content in the second content-modification operation immediately following the first content-modification operation to modify presentation during the second temporal interval of the received content may involve presenting the retrieved second supplemental content during the second temporal interval as a replacement content of the received content, or as overlaid content on the received content.

V. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method carried out among one or more devices that are remotely located from a content-presentation device, the method comprising:

receiving from the content-presentation device a first request for first supplemental content for presentation by the content-presentation device as part of a first content-modification operation, wherein the content-presentation device is configured for receiving and presenting content, wherein the first content-modification operation comprises one or more operations for modifying received content presented during a first upcoming time interval;

transmitting to the content-presentation device a link that points to a set of content items arranged in a playlist, wherein the playlist comprises buffer memory and includes first media content corresponding to the first supplemental content;
receiving from the content-presentation device, a second request for second supplemental content for presentation by the content-presentation device as part of a second content-modification operation, wherein the second content-modification operation comprises one or more operations for modifying received content presented during a second upcoming time interval;
based at least on the first request and the second request, making a determination that the content-presentation device has scheduled carrying out of the second content-modification operation immediately after carrying out the first content-modification operation; and
responsive to making the determination, modifying the playlist to further include second media content corresponding to the second supplemental content positioned in the buffer memory of the playlist immediately after the first media content corresponding to the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

2. The method of claim 1, wherein the transmitted link is associated with the content-presentation device, and wherein transmitting the link to the content-presentation device comprises transmitting the link only to a particular content-presentation device, the particular content-presentation device being the content-presentation device.

3. The method of claim 1, further comprising:
receiving first metadata that specifies scheduling data related to the first content-modification operation;
receiving second metadata that specifies scheduling data related to the second content-modification operation,
and wherein making the determination comprises using at least the received first metadata and the received second metadata to determine that the content-presentation device has scheduled performance of the second content-modification operation immediately after performing the first content-modification operation.

4. The method of claim 1, wherein modifying the playlist to further include the second media content corresponding to the second supplemental content positioned in the buffer memory of the playlist immediately after the first media content corresponding to the first supplemental content comprises appending, within the memory buffer, the second media content to the first media content, thereby concatenating the second supplemental content to the end of the first supplement content together within the memory buffer.

5. The method of claim 1, further comprising:
transmitting to the content-presentation device a message indicating that the link points to both the first supplemental content and the second supplemental content, the message facilitating retrieval of both the first supplemental content and the second supplemental content by the content-presentation device, for performance by the content-presentation device of the first content-modification operation, and of the second content-modification operation immediately after performance of the first content-modification operation.

6. The method of claim 1, further comprising:
receiving from the content-presentation device a content request for the first supplement content, the content request for the first supplement content including the link;
responsive to receiving the content request for the first supplemental content, using the link to retrieve the first supplemental content from the modified playlist;
transmitting the first supplemental content to the content-presentation device;
receiving from the content-presentation device a content request for the second supplement content, the content request for the second supplement content including the link;
responsive to receiving the content request for the second supplemental content, using the link to retrieve the second supplemental content from the modified playlist; and
transmitting the second supplemental content to the content-presentation device.

7. The method of claim 6, wherein the content request for the first supplemental content and the content request for the second supplemental content are received in one of (i) the same request message, or (ii) two different request messages.

8. The method of claim 6, wherein using the link to retrieve the second supplemental content from the modified playlist comprises:
based at least on a determination that the link was also received in the content request for the first supplemental content, determining that the second media content is also in the playlist and positioned immediately after the first media content.

9. The method of claim 6, wherein transmitting the second supplemental content to the content-presentation device comprises transmitting the second supplemental content to the content-presentation device in one of (i) a single transmission including the second supplemental content concatenated to the end of the first supplemental content, or (ii) a separate transmission immediately following a transmission of the first supplemental content to the content-presentation device.

10. A computing system remotely located from a content-presentation device, the computing system comprising:
one or more processors; and
a non-transitory computer-readable storage medium having stored thereon program instructions that, upon execution by the one or more processors, cause the computing system to carry out operations including:
receiving from the content-presentation device a first request for first supplemental content for presentation by the content-presentation device as part of a first content-modification operation, wherein the content-presentation device is configured for receiving and presenting content, wherein the first content-modification operation comprises one or more operations for modifying received content presented during a first upcoming time interval;
transmitting to the content-presentation device a link that points to a set of content items arranged in a playlist, wherein the playlist incudes comprises buffer memory and includes first media content corresponding to the first supplemental content;
receiving from the content-presentation device, a second request for second supplemental content for presentation by the content-presentation device as part of a second content-modification operation, wherein the second content-modification operation comprises one or more operations for modifying received content presented during a second upcoming time interval;

based at least on the first request and the second request, making a determination that the content-presentation device has scheduled carrying out of the second content-modification operation immediately after carrying out the first content-modification operation; and responsive to making the determination, modifying the playlist to further include second media content corresponding to the second supplemental content positioned in the buffer memory of the playlist immediately after the first media content corresponding to the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

11. The computing system of claim 10, wherein the transmitted link is associated with the content-presentation device, and wherein transmitting the link to the content-presentation device comprises transmitting the link only to a particular content-presentation device, the particular content-presentation device being the content-presentation device.

12. The computing system of claim 10, wherein the operations further include:

receiving first metadata that specifies scheduling data related to the first content-modification operation;

receiving second metadata that specifies scheduling data related to the second content-modification operation, and wherein making the determination comprises using at least the received first metadata and the received second metadata to determine that the content-presentation device has scheduled performance of the second content-modification operation immediately after performing the first content-modification operation.

13. The computing system of claim 10, wherein modifying the playlist to further include the second media content corresponding to the second supplemental content positioned in the buffer memory of the playlist immediately after the first media content corresponding to the first supplemental content comprises appending, within the memory buffer, the second supplemental content to the first supplemental content, thereby concatenating the second media content to the end of the first media content together within the memory buffer.

14. The computing system of claim 10, wherein the operations further include:

transmitting to the content-presentation device a message indicating that the link points to both the first supplemental content and the second supplemental content, the message facilitating retrieval of both the first supplemental content and the second supplemental content by the content-presentation device, for performance by the content-presentation device of the first content-modification operation, and of the second content-modification operation immediately after performance of the first content-modification operation.

15. The computing system of claim 14, wherein the operations further include:

receiving from the content-presentation device a content request for the first supplement content, the content request for the first supplement content including the link;

responsive to receiving the content request for the first supplemental content, using the link to retrieve the first supplemental content from the modified playlist;

transmitting the first supplemental content to the content-presentation device;

receiving from the content-presentation device a content request for the second supplement content, the content request for the second supplement content including the link;

responsive to receiving the content request for the second supplemental content, using the link to retrieve the second supplemental content from the modified playlist; and transmitting the second supplemental content to the content-presentation device.

16. The computing system of claim 15, wherein the content request for the first supplemental content and the content request for the second supplemental content are received in one of (i) the same request message, or (ii) two different request messages, and wherein transmitting the second supplemental content to the content-presentation device comprises transmitting the second supplemental content to the content-presentation device in one of (i) a single transmission including the second supplemental content concatenated to the end of the first supplemental content, or (ii) a separate transmission immediately following a transmission of the first supplemental content to the content-presentation device.

17. The computing system of claim 10, wherein the one or more processors are distributed among at least two computing devices communicatively connected by a network.

18. A non-transitory computer-readable storage medium having stored thereon program instructions that, upon execution by one or more processors of a computing system that is remotely located from a content-presentation device, cause the computing system to carry out operations including:

receiving from the content-presentation device a first request for first supplemental content for presentation by the content-presentation device as part of a first content-modification operation, wherein the content-presentation device is configured for receiving and presenting content, wherein the first content-modification operation comprises one or more operations for modifying received content presented during a first upcoming time interval;

transmitting to the content-presentation device a link that points to a set of content items arranged in a playlist, wherein the playlist incudes comprises buffer memory and includes first media content corresponding to the first supplemental content;

receiving from the content-presentation device, a second request for second supplemental content for presentation by the content-presentation device as part of a second content-modification operation, wherein the second content-modification operation comprises one or more operations for modifying received content presented during a second upcoming time interval;

based at least on the first request and the second request, making a determination that the content-presentation device has scheduled carrying out of the second content-modification operation immediately after carrying out the first content-modification operation; and responsive to making the determination, modifying the playlist to further include second media content corresponding to the second supplemental content positioned in the buffer memory of the playlist immediately after the first media content corresponding to the first supplemental content, wherein the link is configured (i) for retrieval of both the first supplemental content and the second supplemental content by the content-presentation device, and (ii) for performance by the content-presentation device of the first content-modification operation and of the second content-modification operation immediately after performance of the first content-modification operation.

19. The non-transitory computer-readable storage medium of claim 18, wherein the operations further include:

receiving first metadata that specifies scheduling data related to the first content-modification operation;

receiving second metadata that specifies scheduling data related to the second content-modification operation, and wherein making the determination comprises using at least the received first metadata and the received second metadata to determine that the content-presentation device has scheduled performance of the second content-modification operation immediately after performing the first content-modification operation.

20. The non-transitory computer-readable storage medium of claim 18, wherein the operations further include:

transmitting to the content-presentation device a message indicating that the link points to both the first supplemental content and the second supplemental content, the message facilitating retrieval of both the first supplemental content and the second supplemental content by the content-presentation device, for performance by the content-presentation device of the first content-modification operation, and of the second content-modification operation immediately after performance of the first content-modification operation.

* * * * *